United States Patent
Wang et al.

(10) Patent No.: US 9,677,913 B2
(45) Date of Patent: Jun. 13, 2017

(54) INDUCTIVE DISPLACEMENT SENSOR

(71) Applicant: Microsemi Corporation, Aliso Viejo, CA (US)

(72) Inventors: Shiju Wang, Irvine, CA (US); Timothy R. Jackson, Yorba Linda, CA (US)

(73) Assignee: MICROSEMI CORPORATION, Aliso Viejo, CA (US)

( * ) Notice: Subject to any disclaimer, the term of this patent is extended or adjusted under 35 U.S.C. 154(b) by 101 days.

(21) Appl. No.: 14/697,836

(22) Filed: Apr. 28, 2015

(65) Prior Publication Data

US 2015/0308860 A1  Oct. 29, 2015

Related U.S. Application Data

(60) Provisional application No. 61/985,372, filed on Apr. 28, 2014.

(51) Int. Cl.
G01B 7/12 (2006.01)
G01D 5/20 (2006.01)
G01D 5/22 (2006.01)

(52) U.S. Cl.
CPC ............ *G01D 5/20* (2013.01); *G01D 5/202* (2013.01); *G01D 5/2291* (2013.01)

(58) Field of Classification Search
CPC ...... G01B 7/003; G01D 5/2013; G01D 5/202; G01D 5/20
USPC ............ 324/207.15, 207.17, 207.18, 207.24, 324/207.25
See application file for complete search history.

(56) References Cited

U.S. PATENT DOCUMENTS

| 4,847,548 A | 7/1989 | Lafler |
| 5,061,896 A | 10/1991 | Schmidt |
| 6,605,940 B1 | 8/2003 | Tabrizi et al. |
| 7,276,897 B2 * | 10/2007 | Lee ............... G01D 5/2053 324/207.17 |

(Continued)

FOREIGN PATENT DOCUMENTS

| DE | 10120822 A1 | 4/2002 |
| EP | 0467514 A2 | 1/1992 |

(Continued)

OTHER PUBLICATIONS

International Search Report and Written Opinion of the International Searching Authority for related application PCT/US2015/027900 mailed on Jun. 23, 2015.

*Primary Examiner* — Reena Aurora
(74) *Attorney, Agent, or Firm* — Squire Patton Boggs

(57) ABSTRACT

Inductive displacement sensors and methods of using them may be useful in a variety of contexts. For example, systems for precisely measuring linear or angular motion may use inductive displacement sensors to measure changes in position. An apparatus, such as a sensor, can include a primary inductor. The apparatus can also include a first secondary inductor that is field-coupled to the primary inductor. The apparatus can further include a second secondary inductor that is field-coupled to the primary inductor. The first secondary inductor and the second secondary inductor can be configured as coordinated inductors to detect motion of a coupler. The coordinated inductors can be configured to provide a reference signal and a measurement signal, wherein the reference signal has a constant amplitude across a range of motion of the coupler.

19 Claims, 13 Drawing Sheets

(56) References Cited

U.S. PATENT DOCUMENTS

| | | | |
|---|---|---|---|
| 7,821,256 B2 * | 10/2010 | Lee ..................... | G01D 5/2258 324/207.17 |
| 2003/0206007 A1 | 11/2003 | Gass et al. | |
| 2004/0080313 A1 | 4/2004 | Brosh | |

FOREIGN PATENT DOCUMENTS

| | | | |
|---|---|---|---|
| FR | 2304900 A1 | | 10/1976 |
| WO | 2008125853 | * | 10/2008 |
| WO | 2008125853 A1 | | 10/2008 |

* cited by examiner

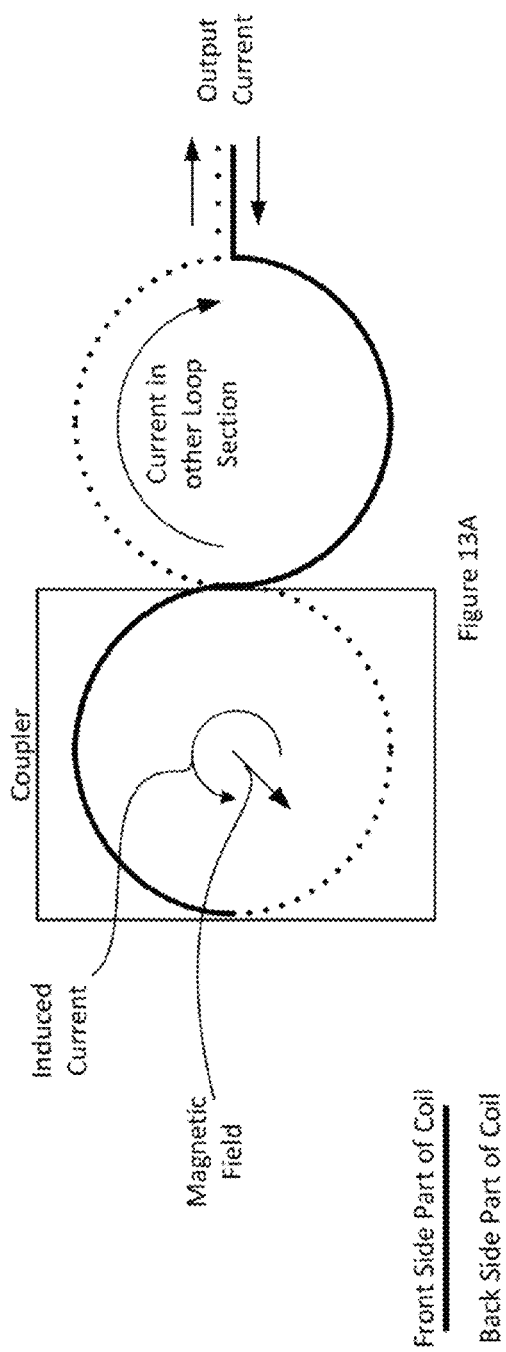
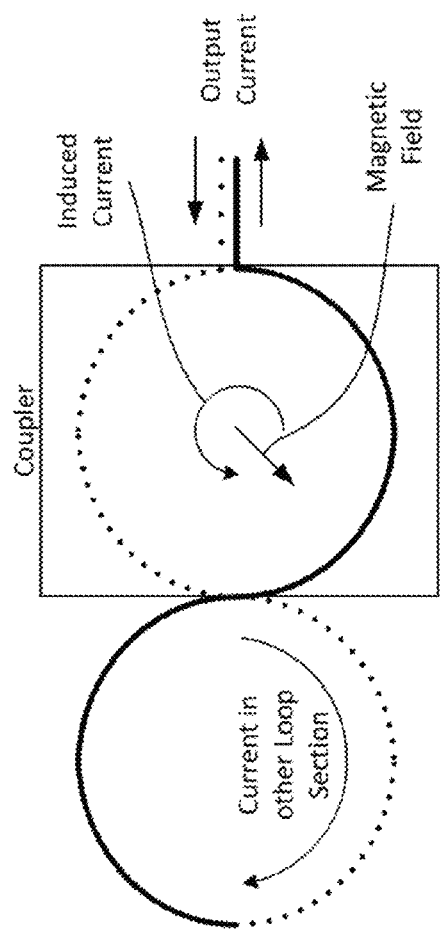
Figure 13A
Figure 13B

INDUCTIVE DISPLACEMENT SENSOR

CROSS-REFERENCE TO RELATED APPLICATION

The present application is related to and claims the benefit and priority of U.S. Provisional Patent Application No. 61/985,372, filed Apr. 28, 2014, the entirety of which is hereby incorporated herein by reference.

BACKGROUND

Field

Inductive displacement sensors and methods of using them may be useful in a variety of contexts. For example, systems for precisely measuring linear or angular motion may use inductive displacement sensors to measure changes in position.

Description of the Related Art

In certain conventional inductive sensors, a primary coil and two secondary coils are provided. In such sensors, the two secondary coils are designed such that the magnitudes of the received signals vary inversely, with respect to one another, with mechanical motion. The early versions of such sensors are known as linear variable differential transformers (LVDT).

The LVDT is an inductive transducer that converts a linear displacement or angular motion relative to a mechanical reference (or zero) into a proportional electrical signal containing phase information (for direction) and amplitude information (for distance). FIG. 1 illustrates typical LVDT configurations.

As shown in FIG. 1, the LVDT consists of a primary coil of wire wound over the whole length of a non-ferromagnetic bore liner or spool tube or over the whole length of a cylindrical, non-conductive material such as a plastic or a ceramic material, in coil form or bobbin. Two secondary coils (Secondary a, Secondary b) are wound around the primary coil. These two secondary coils are typically connected in opposite series or in a differential connection. The secondary coils are symmetrical with respect to one another, such that they effectively form a sine-cosine relationship.

More recent inductive sensors replace the transformer found in a LVDT with coils printed on a PCB. This substitution results in similar magnetic coupling effects with a substantial reduction in size and cost of the sensor. As with LVDT, the primary coil is driven with a sine wave carrier. A coupler, typically another PCB configured with PCB traces that form a shorted coil, is used to couple the field created by the primary coil to the secondary coils such that the amplitude of the received signals varies with mechanical movement of the coupler.

The signals received on the secondary coils provide feedback to the system resulting in automatic gain control (AGC.) This feedback relies on a sine/cosine relationship between the two received signals, which supports the equation: $A^2+B^2=K$, wherein K is a constant. The difference between the calculated K and the ideal value of K is utilized as the feedback signal for the system. The feedback can be utilized to vary the magnitude of the sine wave driven into the primary coil and/or to vary the gain of an amplifier in the signal conditioning path of the system. Because the feedback applies to both signals equally, the ratiometric relationship of the two signals remains intact, and each output continues to proportionally reflect the input.

The signals received on the secondary coils are also utilized to measure mechanical motion. In the case of conventional dual coil inductive sensors, the secondary coils have a sine/cosine relationship which requires signal processing in order to produce a tangent or cotangent result. This tangent/cotangent result must then be processed further, by a look-up table or other means, to create a linear or other output indicative of motion of the coupler. Such signal processing requires a system which includes a processor, memory, and signal processing algorithms.

SUMMARY

According to certain embodiments of the present invention, an apparatus can include a primary inductor, a first secondary inductor that is field-coupled to the primary inductor, and a second secondary inductor that is field-coupled to the primary inductor by a coupler, whose motion is to be detected. The first secondary inductor and the second secondary inductor can be configured as coordinated inductors to detect motion of the coupler. The coordinated inductors can be configured to provide a reference signal and a measurement signal, wherein the reference signal has a constant amplitude across a range of motion of the coupler.

In certain embodiments of the present invention, a method can include energizing a primary inductor. The method can also include providing a reference signal from at least one of a plurality of secondary inductors, wherein the plurality of secondary inductors are field coupled to the primary inductor by a coupler and wherein a pair of secondary inductors from the plurality of secondary inductors is configured as coordinated inductors. The method can further include providing a measurement signal from at least one other one of the plurality of secondary inductors, wherein the measurement signal is configured to reflect motion of the coupler. The reference signal can have a constant amplitude across a range of motion of the coupler. The method can additionally include determining motion of the coupler based on a variation of the measurement signal.

A system, according to certain embodiments of the present invention, can include a sensor comprising a primary inductor, a first secondary inductor that is field-coupled to the primary inductor, and a second secondary inductor that is field-coupled to the primary inductor by a coupler. The first secondary inductor and the second secondary inductor can be configured as coordinated inductors to detect motion of the coupler. The coordinated inductors can be configured to provide a reference signal and a measurement signal. The reference signal can have a constant amplitude across a range of motion of the coupler. The system can also include an output configured to provide a representation of the motion detected by the sensor.

BRIEF DESCRIPTION OF THE DRAWINGS

For proper understanding of the invention, reference should be made to the accompanying drawings, wherein:

FIGS. 13A and 13B illustrate an effect on output current due to position reversal of front side and back side parts of a coil, according to certain embodiments of the present invention.

DETAILED DESCRIPTION

Certain embodiments of the present invention apply to sensors that may be utilized to measure mechanical motion, such as linear motion or angular/rotational motion. Specifically, certain embodiments of the present invention apply to inductive sensors that may utilize a primary coil for radiating a source signal and two or more secondary coils for receiving the radiated source signal via a coupler. The sensor can be implemented as traces on a printed circuit board (PCB). Thus, the coils may be inductors rather than the traditional coiled wires in older sensors, and the word "coil" as used herein is therefore interchangeable with the word "inductor".

More particularly, certain embodiments of the present invention may provide sensor designs and sensor systems in which the secondary coils may be designed such that rather than the sine/cosine relationship in previous sensors, there may be a reference signal and a measurement signal. A fixed signal may be produced by one or the other of the secondary coils irrespective of the coupler position. The fixed signal may be utilized as a reference signal for the system and may provide AGC feedback.

Figure 1:
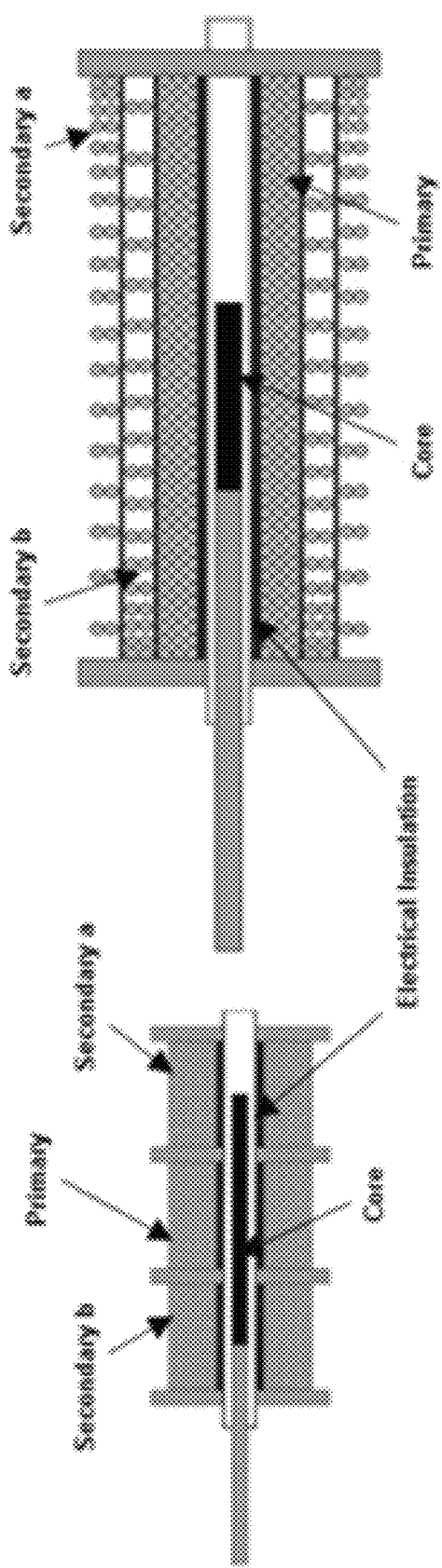
FIG. 1 illustrates typical LVDT configurations.
Figure 2:
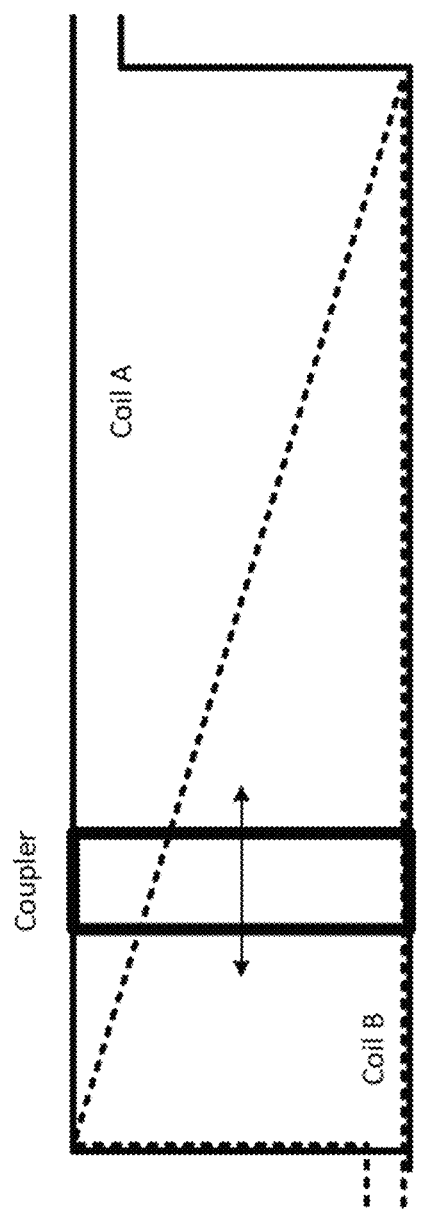
FIG. 2 illustrates an inductive coil configuration, according to certain embodiments of the present invention.

FIG. 2 illustrates an inductive coil configuration, according to certain embodiments of the present invention. In FIG. 2, Coil A has a fixed area over the range of motion of the coupler, as indicated by the solid line enclosed area, and Coil B has an area that is 50% of Coil A, as indicated by the broken line enclosed area, with the area of Coil B arranged to change linearly over the range of motion of the coupler. Thus, as the coupler moves horizontally across the two coils, the signal from Coil A can remain at an unchanging value while the signal from Coil B can increase as the coupler moves to the left and decrease as the coupler moves to the right. Because the change in Coil B area varies linearly, the output signal from Coil B can be linear. This aspect of the coil design results in an output that requires no complex processing in order to achieve a linear output for the system, if such a linear output is desired.

In a system in use in a home or office environment, there may be environmental conditions that expose a sensor to interference signals. Such interference may come from a nearby cell phone, a conductive material placed near the sensor, a magnetic material placed near the sensor or the like.

If the area of the two secondary coils is not exactly the same, then the interfering signal may have an unbalanced effect on the output signals from the coils. This may result in measurement error in the sensor system. In the inductive coil configuration of FIG. 2, the overall area of Coil A is twice the overall area of Coil B, therefore an interfering signal can have twice the coupling effect on Coil A as compared to Coil B. Because the system may not be able to detect the presence of an interfering signal, this effect may result in a system measurement error.

To mitigate such an effect, additional area may be added to Coil B such that the total overall area is equal to the area of Coil A. In the inductive coil configuration illustrated in FIG. 2, the added area may be located outside of the range of the coupler movement (not shown); otherwise the added area can affect the measurement. In this case, the added area of Coil B can increase the physical size of the sensor. One aspect of certain embodiments of the present invention may be that the coils may be drawn very simply, as shown in FIG. 2, or they may be drawn more in a more complex manner, as shown in FIG. 3.

Figure 3:
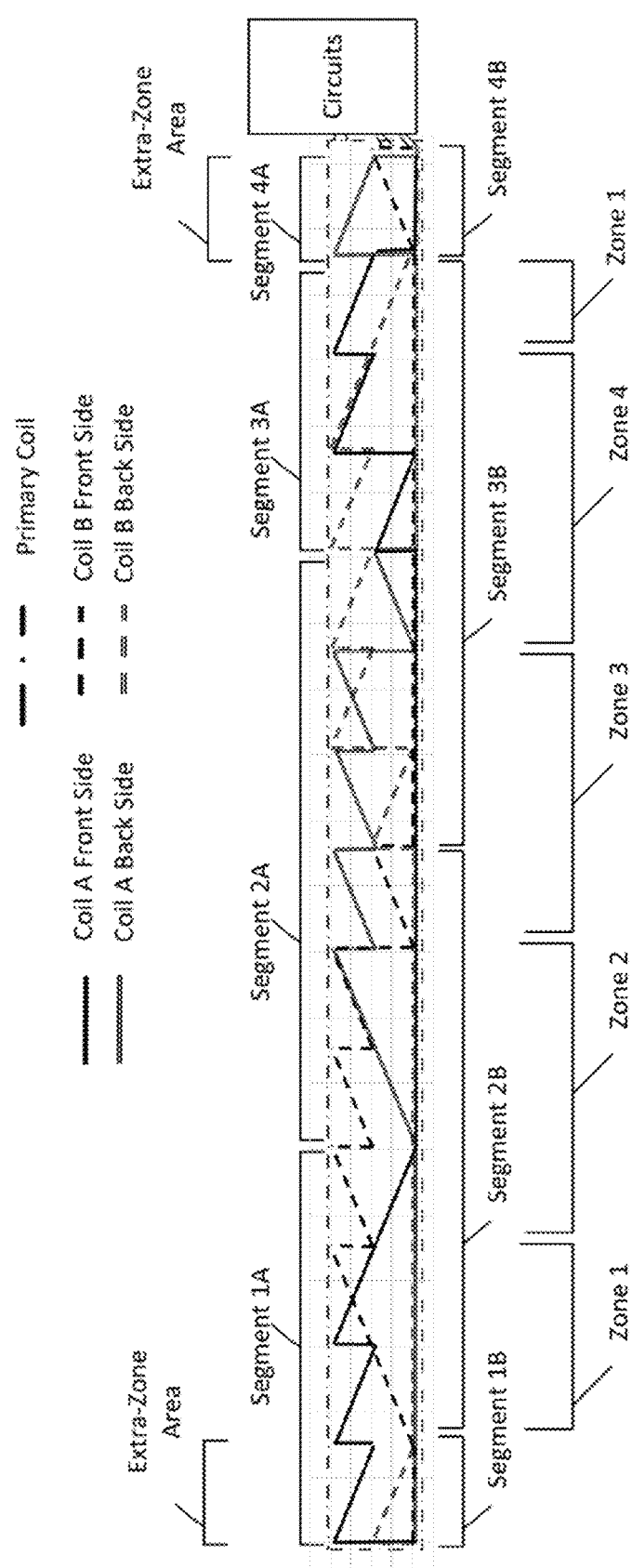
FIG. 3 illustrates a complex inductive coil configuration, according to certain embodiments of the present invention.

FIG. 3 illustrates a complex inductive coil configuration, according to certain embodiments of the present invention. FIG. 3 illustrates a coil system that can be seen in an exploded view in FIG. 5. In this illustration, Coil A may not be designed with a uniform area that may result in a fixed signal output, regardless of the location of the coupler. Instead, Coils A and B may be designed in zones wherein, for a given zone, there may be one coil with fixed area and the other coil may have a varying area over the zone, for example varying linearly.

For example, a given coil may have sections in which the coil has a periodic shape, such as a saw-tooth shape. The coupler may have a width that is equal to the area of the periodicity of the periodic shape. In other words, in such periodic sections, the shape of the trace can periodically repeat. The same coil may have other sections in which the shape is not periodic.

The width of the extra-zone area can be the same the width of the coupler and the length of one period of the repeating shape for the coils. Thus, as can be seen in FIG. 3, in Zone 1, the shape of Coil A found in the extra-zone area is periodically repeated two more times. Therefore, the coupled area for the coupler to Coil A remains constant as long as the right edge of the coupler remains in Zone 1, since the coupler width is equal to the width of the periodic repeating shape, as can be clearly seen in FIG. 5. Similarly, the shape of Coil A in Zone 3 is three periodic repetitions of the shape of Coil A in the last section of Zone 2. Therefore, the coupled area for the coupler remains constant in Zone 3.

By contrast, in Zone 2 as illustrated in the example of FIG. 3, the shape of Coil A is not periodic. Thus, the coupled area varies. In this example, the coupled area varies linearly. In the same way, in Zone 4 the shape of Coil A is not periodic. Thus, the coupled area in Zone 4 changes linearly.

Analogously, in Zones 1 and 3, the shape of Coil B is aperiodic, whereas in Zones 2 and 4, the shape of Coil B is periodic, repeating the shape from the immediately preceding section.

Thus, in Zones 1 and 3, the coupled area of Coil A can be constant from when a right edge of the coupler passes into Zone 1 until the right edge of the coupler passes into Zone 2, while the coupled area of Coil B can vary linearly. Thus, in Zones 1 and 3 Coil A can be the reference coil. In Zones 2 and 4, the coupled area of Coil B can be constant, while the coupled area of Coil A can vary linearly. Zone 1 can include a portion at one end and another portion at the other end. This second portion of Zone 1 is grouped with Zone 1 because they use the same coil reference with the same reference value, such that they are complementary, as can be seen from FIG. 6. Alternatively, one of the portions of Zone 1 could be called Zone 5. Thus, from zone to zone, the fixed area can be alternated between the two coils.

In addition, each coil can have multiple segments. For each segment the coils can be switched to opposite sides of the printed circuit board (PCB). This can reverse the voltage generated by a field coupled into that segment of the coil, because the coupling direction is effectively changed, for example from clockwise to counter-clockwise or vice versa. For example, in Segments 1A and 3A, Coil A can be on a top side of the PCB while in Segments 2A and 4A, Coil A can be on a back side of the PCB. Likewise, in Segments 1B and 3B, Coil B can be on a back side of the PCB, while in Segments 2B and 4B, Coil B can be on a front side of the PCB. The coils can be connected to processing circuits at one or more end(s) of the PCB.

The coils can be designed such that the total area of each coil may be equal to the total area of the other coil, which can result in a coil design wherein the entire area of both coils may be contained within the mechanical movement range of the coupler. In the exemplary embodiment shown in FIG. 3, there may be two extra-zone areas that are used to make the total area equal. In addition, the coils can each be configured such that the net voltage generated across the coil is zero, in the absence of a coupler, for example by generating a uniform field with the primary coil. The primary coil, in this embodiment of the present invention, can outline the coil section of the PCB, essentially circumscribing Coil A and Coil B.

In other words, the coil design can alternate the fixed signal between the two secondary coils. This can result in each coil having the same overall magnetic field area, which can result in common mode rejection of any interference fields and/or signals to which the sensor may be exposed. The actual measurement signal can be provided by the coil that does not present a fixed area over the segment. The resulting measurement can be linear, and therefore can require no processing, other than filtering and/or linearization.

Figure 4:
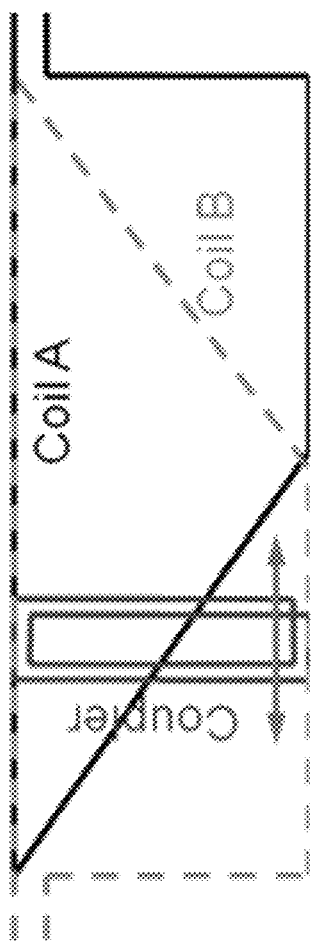
FIG. 4 illustrates an inductive coil, according to certain embodiments of the present invention.

FIG. 4 illustrates an inductive coil according to certain embodiments of the present invention, where Coil A is shown as a solid line and Coil B is shown as a dotted line. For the left half of the movement range, Coil B provides a fixed signal and serves as the reference, while Coil A serves as the measurement signal. For the right half of the sensor, Coil A provides a fixed signal and serves as the reference while Coil B serves as the measurement signal. Because either Coil A or Coil B may provide a fixed signal, the sensor system may include a circuit that compares the Coil A signal and the Coil B signal to determine which signal should provide the AGC feedback. A more complex coil design is shown in FIG. 5, with associated calculations shown in FIG. 5 for the various sensor segments.

Figure 5:
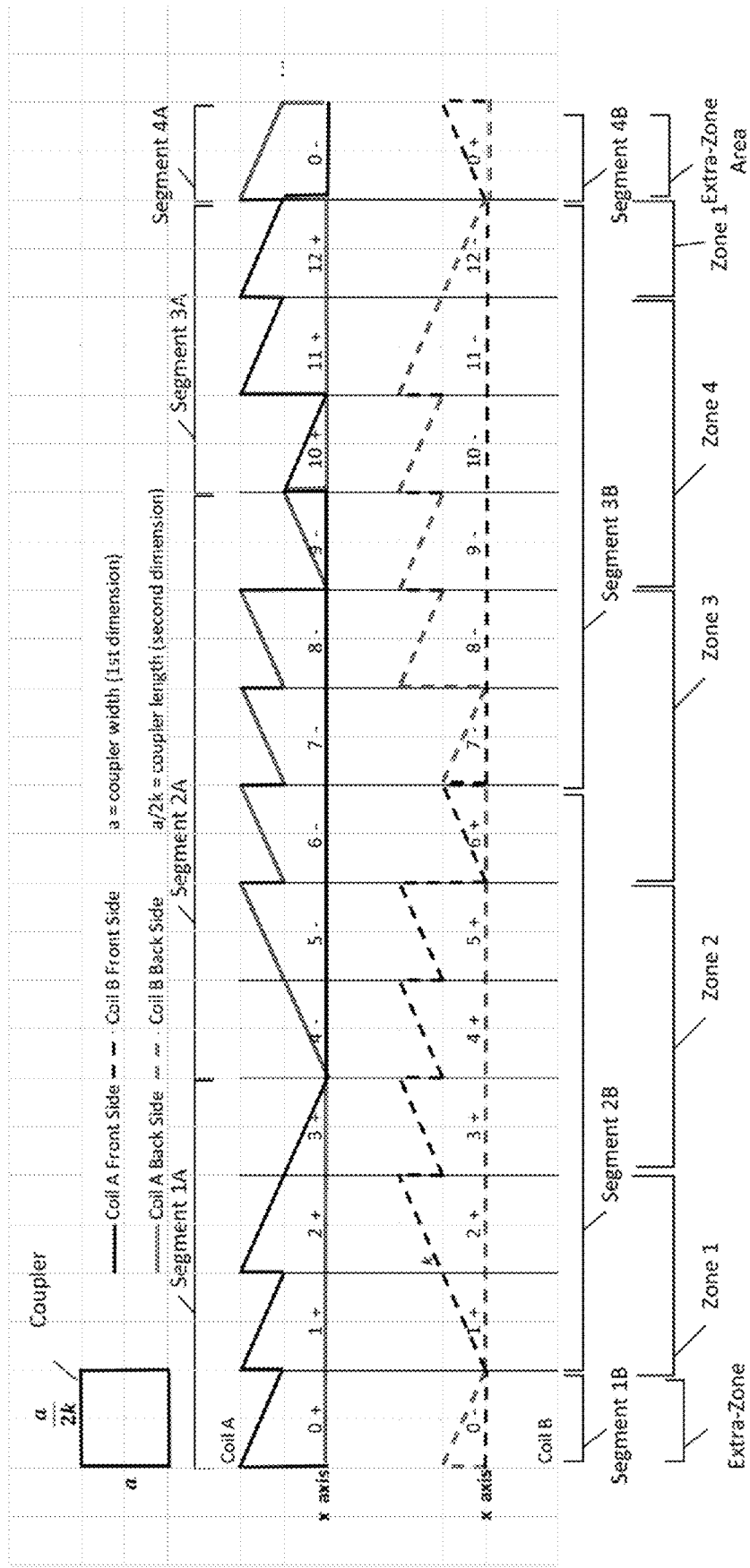
FIG. 5 illustrates a complex inductive coil, according to certain embodiments of the present invention.

FIG. 5 illustrates a complex inductive coil, according to certain embodiments of the present invention. For clarity, Coil A is shown along with an x-axis in the upper portion of the drawing and Coil B is shown along with an x-axis, which is identical with the x-axis of Coil A, in the lower portion of the drawing. Coil A is shown as a single solid line when it is on a first side of the PCB and as a double solid line when it is on the second side of the PCB. Coil B is shown as a single broken line when it is on the first side of the PCB and as a double broken line when it is on the second side of the PCB.

In segment 1A the coupled area of Coil A appears on the first side of the PCB, with the return on the second side of the PCB. In segment 2A the coupled area of Coil A appears on the second side of the PCB, with the return on the first side of the PCB. In segment 3A the coupled area of Coil A appears on the first side of the PCB, with the return on the second side of the PCB. In segment 4A the coupled area of Coil A appears on the second side of the PCB, with the return on the first side of the PCB.

In segment 1B the coupled area of Coil B appears on the second side of the PCB, with the return on the first side of the PCB. In segment 2B the coupled area of Coil B appears on the first side of the PCB, with the return on the second side of the PCB. In segment 3B the coupled area of Coil B appears on the second side of the PCB, with the return on the first side of the PCB. In segment 4B the coupled area of Coil B appears on the first side of the PCB, with the return on the second side of the PCB As shown in FIG. 5, small portions of the coils may be provided outside of a measurement range, e.g., at sections labelled 0+ and 0−, to balance the area between coordinated coils. The details corresponding to sections 0-12 of the coils are shown in table 1, as follows:

TABLE 1

| | | | | | |
|---|---|---|---|---|---|
| 0<br>A+/B− | $l_{A0} = a - kx$<br>$-\frac{a}{2k} < x \leq 0$ | $A_{A0} = ax - \frac{kx^2}{2}$<br>$-\frac{a}{2k} < x \leq 0$ | $l_{B0} = -kx$<br>$-\frac{a}{2k} < x \leq 0$ | $A_{B0} = \frac{a}{2}x - \frac{a^2}{8k}$<br>$-\frac{a}{2k} < x \leq 0$ | |
| 1<br>A+/B+ | $l_{A1} = 0$<br>$0 < x \leq \frac{a}{2k}$ | $A_{A1} = \frac{3a^2}{8k}$<br>$0 < x \leq \frac{a}{2k}$ | $l_{B1} = \frac{a}{2}$<br>$0 < x \leq \frac{a}{2k}$ | $A_{B1} = \frac{a}{2}x - \frac{a^2}{8k}$<br>$0 < x \leq \frac{a}{2k}$ | |
| 2<br>A+/B+ | $l_{A2} = 0$<br>$\frac{a}{2k} \leq x \leq \frac{a}{k}$ | $A_{A2} = \frac{3a^2}{8k}$<br>$\frac{a}{2k} \leq x \leq \frac{a}{k}$ | $l_{B2} = \frac{a}{2}$<br>$\frac{a}{2k} \leq x \leq \frac{a}{k}$ | $A_{B2} = \frac{ax}{2} - \frac{a^2}{8k}$<br>$\frac{a}{2k} \leq x \leq \frac{a}{k}$ | |

TABLE 1-continued

| | | | | |
|---|---|---|---|---|
| 3<br>A+/B+ | $l_{A3} = -\frac{a}{2}$<br>$\frac{a}{k} \leq x \leq \frac{3a}{2k}$ | $A_{A3} = \frac{7a^2}{8k} - \frac{ax}{2}$<br>$\frac{a}{k} \leq x \leq \frac{3a}{2k}$ | $l_{B3} = 0$<br>$\frac{a}{k} \leq x \leq \frac{3a}{2k}$ | $A_{B3} = \frac{3a^2}{8k}$<br>$\frac{a}{k} \leq x \leq \frac{3a}{2k}$ |
| 4<br>A−/B+ | $l_{A3} = -\frac{a}{2}$<br>$\frac{3a}{2k} \leq x \leq \frac{2a}{k}$ | $A_{A4} = \frac{7a^2}{8k} - \frac{ax}{2}$<br>$\frac{3a}{2k} \leq x \leq \frac{2a}{k}$ | $l_{B4} = 0$<br>$\frac{3a}{2k} \leq x \leq \frac{2a}{k}$ | $A_{B4} = \frac{3a^2}{8k}$<br>$\frac{3a}{2k} \leq x \leq \frac{2a}{k}$ |
| 5<br>A−/B+ | $l_{A5} = -\frac{a}{2}$<br>$\frac{4a}{2k} \leq x \leq \frac{5a}{2k}$ | $A_{A5} = \frac{7a^2}{8k} - \frac{ax}{2}$<br>$\frac{4a}{2k} \leq x \leq \frac{5a}{2k}$ | $l_{B5} = 0$<br>$\frac{4a}{2k} \leq x \leq \frac{5a}{2k}$ | $A_{B5} = \frac{3a^2}{8k}$<br>$\frac{4a}{2k} \leq x \leq \frac{5a}{2k}$ |
| 6<br>A−/B+ | $l_{A6} = 0$<br>$\frac{5a}{2k} \leq x \leq \frac{6a}{2k}$ | $A_{A6} = -\frac{3a^2}{8k}$<br>$\frac{5a}{2k} \leq x \leq \frac{6a}{2k}$ | $l_{B6} = -\frac{a}{2}$<br>$\frac{5a}{2k} \leq x \leq \frac{6a}{2k}$ | $A_{B6} = \frac{13a^2}{8k} - \frac{ax}{2}$<br>$\frac{5a}{2k} \leq x \leq \frac{6a}{2k}$ |
| 7<br>A−/B− | $l_{A7} = 0$<br>$\frac{6a}{2k} \leq x \leq \frac{7a}{2k}$ | $A_{A7} = -\frac{3a^2}{8k}$<br>$\frac{6a}{2k} \leq x \leq \frac{7a}{2k}$ | $l_{B7} = -\frac{a}{2}$<br>$\frac{6a}{2k} \leq x \leq \frac{7a}{2k}$ | $A_{B7} = \frac{13a^2}{8k} - \frac{ax}{2}$<br>$\frac{6a}{2k} \leq x \leq \frac{7a}{2k}$ |
| 8<br>A−/B− | $l_{A8} = 0$<br>$\frac{7a}{2k} \leq x \leq \frac{8a}{2k}$ | $A_{A8} = -\frac{3a^2}{8k}$<br>$\frac{7a}{2k} \leq x \leq \frac{8a}{2k}$ | $l_{B8} = -\frac{a}{2}$<br>$\frac{7a}{2k} \leq x \leq \frac{8a}{2k}$ | $A_{B8} = \frac{13a^2}{8k} - \frac{ax}{2}$<br>$\frac{7a}{2k} \leq x \leq \frac{8a}{2k}$ |
| 9<br>A−/B− | $l_{A9} = \frac{a}{2}$<br>$\frac{8a}{2k} \leq x \leq \frac{9a}{2k}$ | $A_{A9} = \frac{ax}{2} - \frac{19a^2}{8k}$<br>$\frac{8a}{2k} \leq x \leq \frac{9a}{2k}$ | $l_{B9} = 0$<br>$\frac{8a}{2k} \leq x \leq \frac{9a}{2k}$ | $A_{B9} = -\frac{3a^2}{8k}$<br>$\frac{8a}{2k} \leq x \leq \frac{9a}{2k}$ |
| 10<br>A+/B− | $l_{A10} = \frac{a}{2}$<br>$\frac{9a}{2k} \leq x \leq \frac{10a}{2k}$ | $A_{A10} = \frac{ax}{2} - \frac{19a^2}{8k}$<br>$\frac{9a}{2k} \leq x \leq \frac{10a}{2k}$ | $l_{B10} = 0$<br>$\frac{9a}{2k} \leq x \leq \frac{10a}{2k}$ | $A_{B10} = -\frac{3a^2}{8k}$<br>$\frac{9a}{2k} \leq x \leq \frac{10a}{2k}$ |
| 11<br>A+/B− | $l_{A11} = \frac{a}{2}$<br>$\frac{10a}{2k} \leq x \leq \frac{11a}{2k}$ | $A_{A11} = \frac{ax}{2} - \frac{19a^2}{8k}$<br>$\frac{10a}{2k} \leq x \leq \frac{11a}{2k}$ | $l_{B11} = 0$<br>$\frac{10a}{2k} \leq x \leq \frac{11a}{2k}$ | $A_{B11} = -\frac{3a^2}{8k}$<br>$\frac{10a}{2k} \leq x \leq \frac{11a}{2k}$ |
| 12<br>A+/B− | $l_{A12} = 0$<br>$\frac{11a}{2k} \leq x \leq \frac{12a}{2k}$ | $A_{A12} = \frac{3a^2}{8k}$<br>$\frac{11a}{2k} \leq x \leq \frac{12a}{2k}$ | $l_{B12} = -\frac{a}{2}$<br>$\frac{11a}{2k} \leq x \leq \frac{12a}{2k}$ | $A_{B12} = \frac{ax}{2} - \frac{25a^2}{8k}$<br>$\frac{11a}{2k} \leq x \leq \frac{12a}{2k}$ |

In table 1, A represents the coupled area of the coil as a function of coupler position x. Similarly, l represents a rate of change of coupling area versus coupler position x. In this table and in FIG. 5, a represents a coupler width or first dimension, and a/2k represents a coupler length or second dimension. The subscripts in the table indicate the corresponding coil (coil A is A, while coil B is B) and section (from 0 to 12, as shown in the left column). In the table, A+ indicates that the signal from coil A is the same phase as the primary coil, B+ indicates that the signal from coil B is the same phase as the primary coil, A− indicates that the signal from coil A is the opposite phase from the primary coil, and B− indicates that the signal from coil B is the opposite phase from the primary coil.

FIG. 5 provides an exploded view of the circuit illustrated in FIG. 3, although without the accompanying circuits or primary coil. Thus, FIG. 5 also has similar segments and zones as shown in FIG. 3. FIG. 5 also illustrates the coupler. The output signals generated by this set of coils are shown in FIG. 6.

Figure 12:
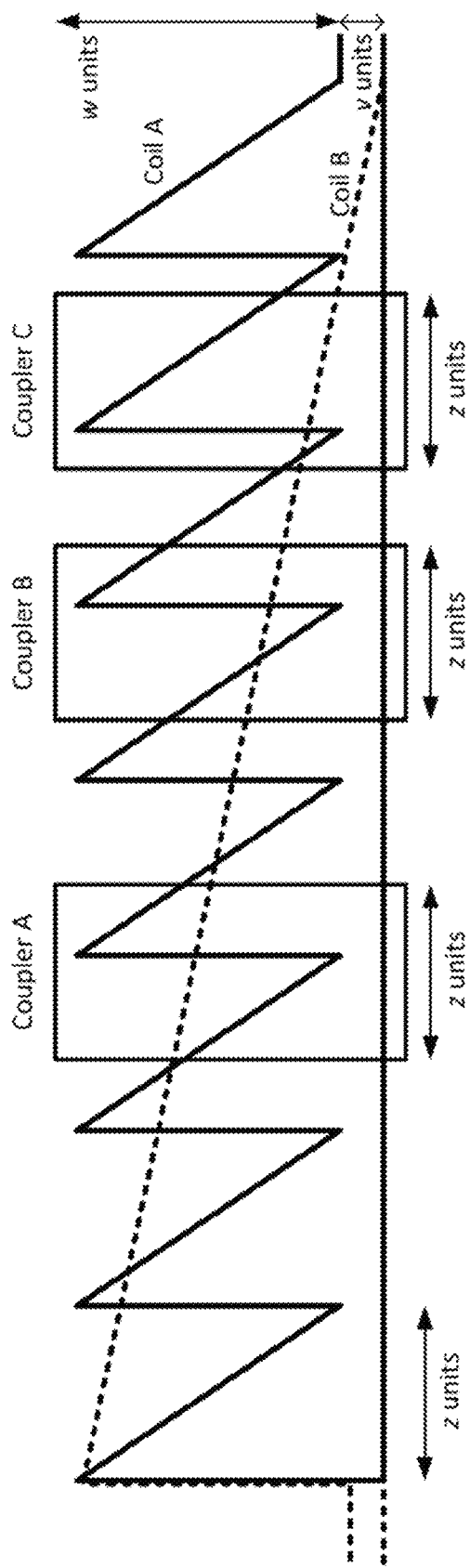
FIG. 12 illustrates a fixed coupled area with varying inductor position, according to certain embodiments of the present invention.

As noted above with reference to FIG. 3, the shapes of the coils in FIG. 5 can be configured to provide a constant coupled area through periodic repetition of the same shape, with the periodicity of the shape corresponding to the width of the coupler. In the illustration in FIG. 5, the width of the coupler is a/2k, which is approximately identical to the width of each of sections 0 through 12. Thus, even as the coupler moves fluidly in Zone 1, the total coupled area for Coil A can remain constant, even though the shape of the coupled area for Coil A changes. FIG. 12, discussed below, further illustrates this principle, in a case where the width of the coupler and the periodicity of the shape of Coil A is z units.

Figure 6:
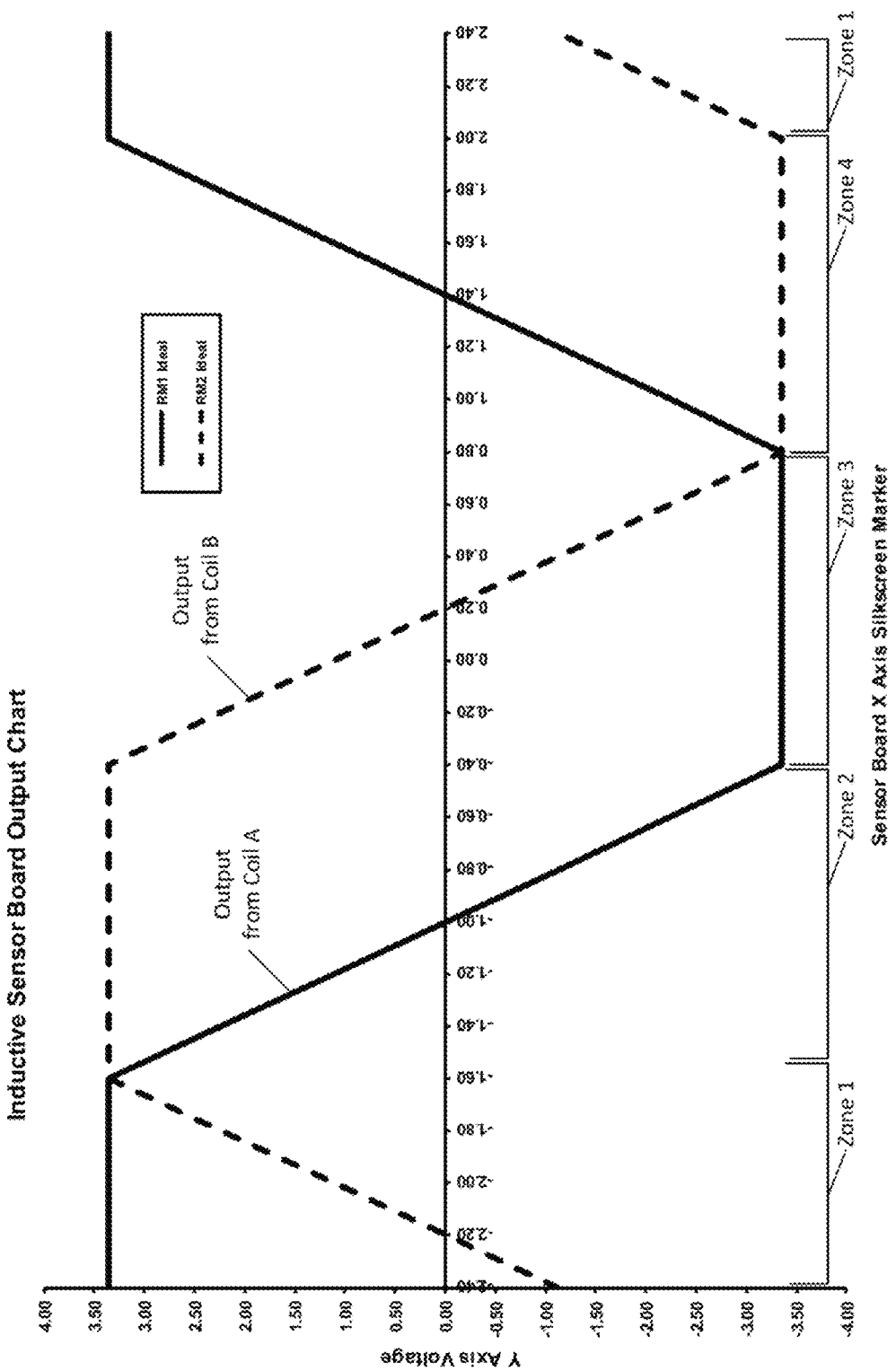
FIG. 6 illustrates signals from a complex inductive coil, according to certain embodiments of the present invention.

FIG. 6 illustrates signals from the complex inductive coil of FIG. 5, according to certain embodiments of the present invention. In Zone 1, the Coil A signal, shown as a dotted line is a fixed signal and the Coil B signal, shown as a solid line, varies with the position of the coupler. In Zone 2, the Coil B signal becomes a fixed signal and the Coil A signal becomes the measurement signal. In Zone 3, the fixed signal is provided by Coil A, but the signal is inverted as compared with the fixed signal of Zone 1. In Zone 4, the signal from Coil B is a fixed signal and is also inverted as compared with the fixed signal of Zone 2. The system can use the absolute value of the fixed signal in each zone in order to determine the source of the AGC feedback signal, and the sign of the fixed signal can be used to determine in which of the zones the coupler is presently located.

Figure 7:
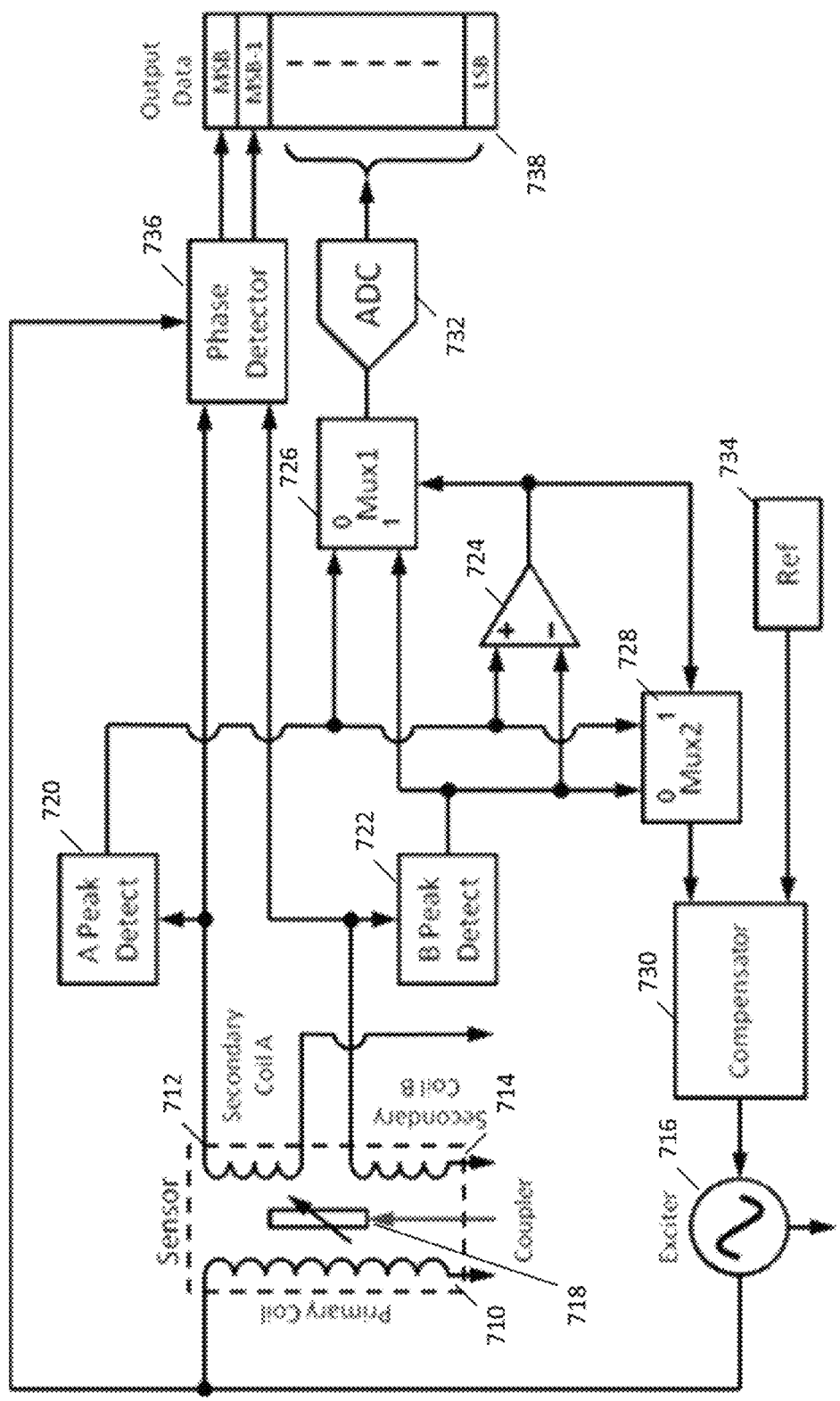
FIG. 7 illustrates a sensor system, according to certain embodiments of the present invention.

The sensor can serve as an element of a measurement system that also may include signal conditioning, data conversion, and data processing. FIG. 7 illustrates a sensor system, according to certain embodiments of the present invention.

As shown in FIG. 7 and discussed above, the sensor system can include a primary coil 710 and two secondary coils: secondary coil A 712 and secondary coil B 714. An exciter 716 can drive a sine wave into the primary coil 710 of the sensor. The sine wave can be coupled onto secondary coil A 712 and secondary coil B 714 by a coupler 718, which may be allowed to move and whose position may be detected. The magnitude of the coupled signal onto each secondary coil 712 and 714 can be determined by the position of the coupler 718 within the sensor. In other words, the position of the coupler 718 can control the magnitude of the coupled signal.

Each secondary coil signal can be applied to a respective peak detector (A_Peak_Detect 720 and B_Peak_Detect 722) provided with an absolute value circuit. The combined peak detection and absolute value circuits 720, 722 can output the absolute value of the associated input signal. The sensor can be designed such that the signal from at least one of the secondary coils 712 and 714, i.e. the signal with a fixed value over the zone, is at a maximum level. Thus, the output of each peak detector can be applied to an input of a comparator 724 in order to determine which signal is greater. The use of an absolute value circuit before the comparator 724 can prevent the comparator 724 from treating a phase reversed signal as being a negative value that is lower. A maximum signal may be easier to discriminate when comparing the two signals. If the reference is some intermediate level, then additional circuitry can be used to determine which signal is closest to the reference and remains at the reference as the other signal varies. The output of the comparator 724 can then be utilized by Mux1 726 and Mux2 728 to determine the signal source for a compensator 730 and an analog-to-digital converter (ADC) 732.

The outputs of peak detector 720 and peak detector 722 can also be connected to be an input for multiplexer Mux1 726 for output to the ADC 732 and to be an input for multiplexer Mux2 728 for output to the compensator 730 selected by the output of the comparator 724.

When the signal from A_Peak_Detect 720 is greater than the signal from B_Peak_Detect 722, the comparator 724 can output a '1', indicating that the signal A_Peak_Detect 720 may be the reference signal for the system. In this case, Mux1 726 can select the signal from B_Peak_Detect 722 as the source for the ADC 732. The B_Peak_Detect 722 signal can be digitized and converted into the lower data bits of an output word. In parallel, Mux2 728 can select the signal from A_Peak_Detect 720 as the source for the compensator 730. The compensator 730 can compare the A_Peak_Detect 720 signal to a fixed reference (Ref) 734 signal. If the A_Peak_Detect 720 signal is greater than the Ref 734 signal, the compensator 730 can output a signal to the exciter 716 such that the exciter 716 sine wave output amplitude is reduced. If the A_Peak_Detect 720 signal is less than the Ref 734 signal, the compensator 730 can output a signal to the exciter 716 such that the exciter 716 sine wave output amplitude is increased.

When the signal from B_Peak_Detect 722 is greater than the signal from A_Peak_Detect 720, the comparator 724 can output a '0', indicating that the B_Peak_Detect 722 signal may be the reference signal for the system. In this case, Mux1 726 can select the signal from A_Peak_Detect 720 as the source for the ADC 732. The A_Peak_Detect 720 signal can be digitized and converted into the lower data bits of the output data. In parallel, Mux2 728 can select the signal from B_Peak_Detect 722 as the source for the compensator 730. The compensator 730 can compare the B_Peak_Detect 722 signal to the Ref 734 signal. If the B_Peak_Detect 722 signal is greater than the Ref 734 signal, the compensator 730 can output a signal to the exciter 716 such that the exciter 716 sine wave output amplitude is reduced. If the B_Peak_Detect 722 signal is less than the Ref 734 signal, the compensator 730 can output a signal to the exciter 716 such that the exciter 716 sine wave output amplitude is increased.

At a corner of travel, such as at the interface between zones 3 and 4, as shown by way of example in FIG. 6, both signals may be the same. In such a case, the comparator 724, as shown in FIG. 7, may have some hysteresis that maintains the output until one signal, which will be the reference signal, drops below the other signal by a predetermined amount. At that point, the comparator 724 output can change.

Again with reference to FIG. 7, each secondary coil signal can also be applied to an input of a phase detector 736, along with the sine wave signal from the exciter 716. The phase detector 736 can utilize these signals in order to determine the phase of each secondary coil signal. The output of the phase detector 736 can be a 2-bit data semi-nibble that may serve as the two most significant bits (MSBs) of the output data 738.

In other words, the phase detector can be used to determine which segment of the sensor is being considered in multi-segment implementations, as described above in relation to FIG. 6, while the least significant bits of the output data 738 can be the particular value within the range of motion of a particular segment.

More particularly, each secondary coil 712 and 714 can be arranged such that the area of each secondary coil may be divided into a plurality of segments, e.g., two or more segments. In the first segment, a magnetic field can cause current to flow in one direction, and in the second segment, that same magnetic field can cause current to flow in the opposite direction. This configuration can allow each coil to have common mode rejection of any unwanted adjacent magnetic fields which may be in proximity to the sensor. In the sensor system, mechanical motion can cause the coupler 718 to be moved across the sensor PCB on which the secondary coils 712 and 714 may be printed. As the coupler 718 moves across the first segment of a given secondary coil 712 or 714, the signal from that secondary coil can be affected.

As the coupler 718 moves from the first segment of a secondary coil 712 or 714 to the second segment of the secondary coil 712 or 714, the polarity of the signal can reverse. Because the signal on the primary coil 710 may be a sine wave, that polarity change can effectively be a 180-degree phase shift in the resulting sine (or cosine) wave output by the secondary coil 712 or 714. In other words, the signals on the secondary coils 712 and 714 can be 90-degrees out of phase with respect to each other, so they may have a sine/cosine relationship. In a typical inductive sensor system, this relationship can be utilized as feedback for the exciter 716. Because $\sin^2+\cos^2=1$, the system can perform this math and compare the results to a constant. If the result is above or below the constant, the system can adjust the exciter 716 output lower or higher, respectively. In terms of measurement, the sine and cosine may be carriers. The system can demodulate the signals to remove the carrier such that an amplitude remains. The two amplitudes can have a ratiometric relationship that can be utilized to calculate a measured value. As described above, such typical inductive sensor systems are quite complex and costly.

The phase shift produced by the polarity change can be relative to the phase of the sine wave generated by the exciter 716. In certain embodiments of the present invention, the phase detector 736 can receive the sine wave signal from the exciter 716 and also the sine or cosine signal from each secondary coil 712 and 714. The phase detector 736 can compare each secondary coil signal to the exciter 716 signal to determine the phase of the secondary coil signal. Because the phase can be one of two states, such as 0-degree or 180-degree with respect to the exciter 716, the output of the phase detector 736 can be one digital bit for each secondary coil 712 and 714, or a combined two digital bits for the sensor system. By utilizing this phase detector approach, two bits of resolution can be added to the digitizing process without increasing the complexity of the ADC.

Using the above approach, four areas can be created across the sensor, using two secondary coils with each coil having two phases. Other approaches with more secondary coils and more phases are also permitted.

Figure 8:
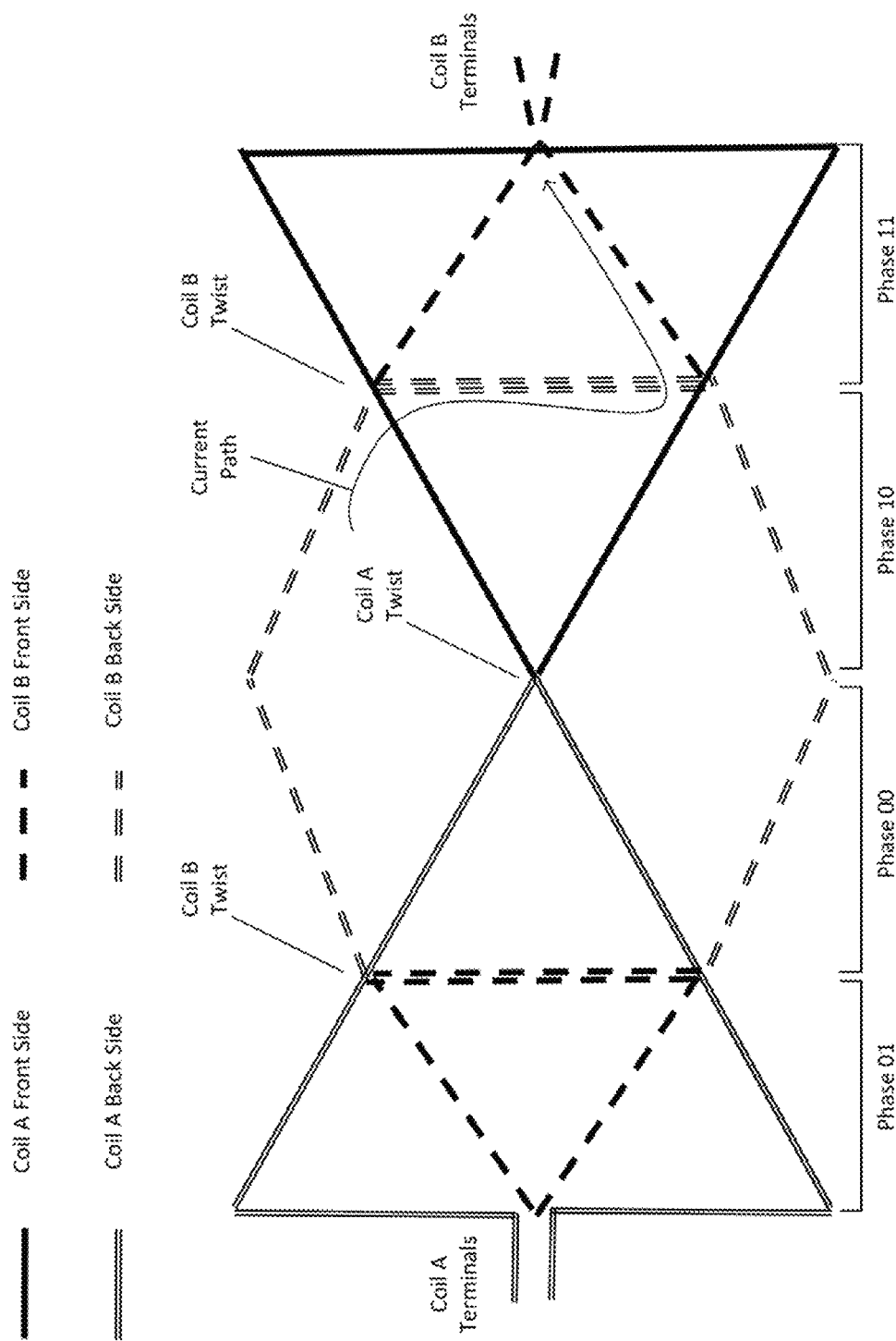
FIG. 8 illustrates the relationship of multiple phases to identification of particular segments, according to certain embodiments of the present invention.

FIG. 8 illustrates the relationship of multiple phases to identification of particular segments, according to certain embodiments of the present invention. Coil A and Coil B may each be drawn in multiple segments, as illustrated with solid and dashed lines, where Coil A is shown as a single line on the front side of the PCB and as a double line on the back side of the PCB and where Coil B is shown as a broken single line on the front side of the PCB and a double broken line on the back side of the PCB. When the front side portions of the coil are coupled, the output current flows in a first direction namely in phase with the excitation current (not shown), and when the back side portions are coupled, the output current flows in the opposite direction, namely with an offset phase relative to the excitation current.

This reversal in phase/current direction can be accomplished by the coils effectively twisting while switching sides from a front of the PCB to the back of the PCB and vice versa. One example of a current path through a twist is shown for ease of understanding. This twisting can also be done as illustrated in FIG. 5, at the boundaries between each pair of segments. For example, at the transition between Segment 1A and Segment 2A, the effective direction of the loop around the coupled magnetic field is reversed. This principle is further illustrated in FIGS. 13A and 13B.

The principle illustrated in FIG. 8 may provide the phase information. The segments of Coil A and Coil B can be offset with respect to each other and alternated such that four areas may be created across the sensor. The use of equal areas may be one implementation, but unequal areas may also be possible.

These areas are designated Phase 01, Phase 00, Phase 10, and Phase 11. This convention can refer to the fact that in area Phase 01, the phase of Coil A is offset (0) whereas the phase of Coil B is in line (1) with the excitation coil. Similar conventions are applied to the other names of the other areas, as discussed below.

In this illustration of FIG. 8, neither the area of Coil A nor Coil B in the area identified as Phase 01 is fixed. Thus, regardless of which coil is selected as a reference, the reference value would now be changing as the coupler (not shown) moves. Therefore, FIG. 8 is not representative of a coil with a fixed reference. Rather, FIG. 8 illustrates an implementation of a dual coil that generates four distinct zones based on reversing the polarity of the coils, thereby explaining and illustrating the phase shift principle.

Each of these areas can be uniquely identified through the combined phase information. In the first area, Coil A may be phase 0 and Coil B may be phase 1 (01); in the second area, Coil A may be phase 0 and Coil B may be phase 0 (00); in the third area, Coil A may be phase 1 and Coil B may be phase 0 (10); and in the final area, Coil A may be phase 1 and Coil B may be phase 1 (11). Thus, two bits of resolution can be provided through this phase information. Without the phase information, an ADC with two additional bits of resolution may be needed in order to obtain the same resolution across the length of the sensor.

For example, in certain embodiments of the present invention an 8-bit ADC can be used. For a system that requires 360-degree measurement, the ADC may be configured to resolve the mechanical motion to within 1.4 degrees across the entire 360-degree range of motion. However, because certain embodiments of the present invention utilize phase information, that same 8-bit ADC may only need to cover an equivalent measurement of only 90-degrees, because phase information can provide the quadrant location. Thus, the 8-bits can be applied across a 90-degree range, yielding a resolution of 0.35 degrees across the entire range of motion.

Certain embodiments of the present invention may have various benefits or advantages. For example, a system according to certain embodiments of the present invention may use a single ADC in order to measure position information. This may reduce system cost, improve performance, as there will be no crosstalk between multiple ADCs, and reduce system power.

Furthermore, certain embodiments of the present invention may apply to an inductive sensor design and a sensor system in which the design of the sensor and system may eliminate the traditional sine/cosine relationship of LVDT and inductive sensors, thereby significantly reducing the signal processing required to produce a linear measurement output.

Furthermore, certain embodiments of the present invention may simplify the design of the inductive sensor PCB. Also, certain embodiments of the present invention may simplify the feedback circuitry that creates the AGC function. Additionally, certain embodiments of the present invention may simplify the processing of the measurement signals. The sensor may provide a linear output and therefore may not require tangent/cotangent processing. This may eliminate the need for a processor and/or reduce the amount of on-chip memory required.

Figure 9:
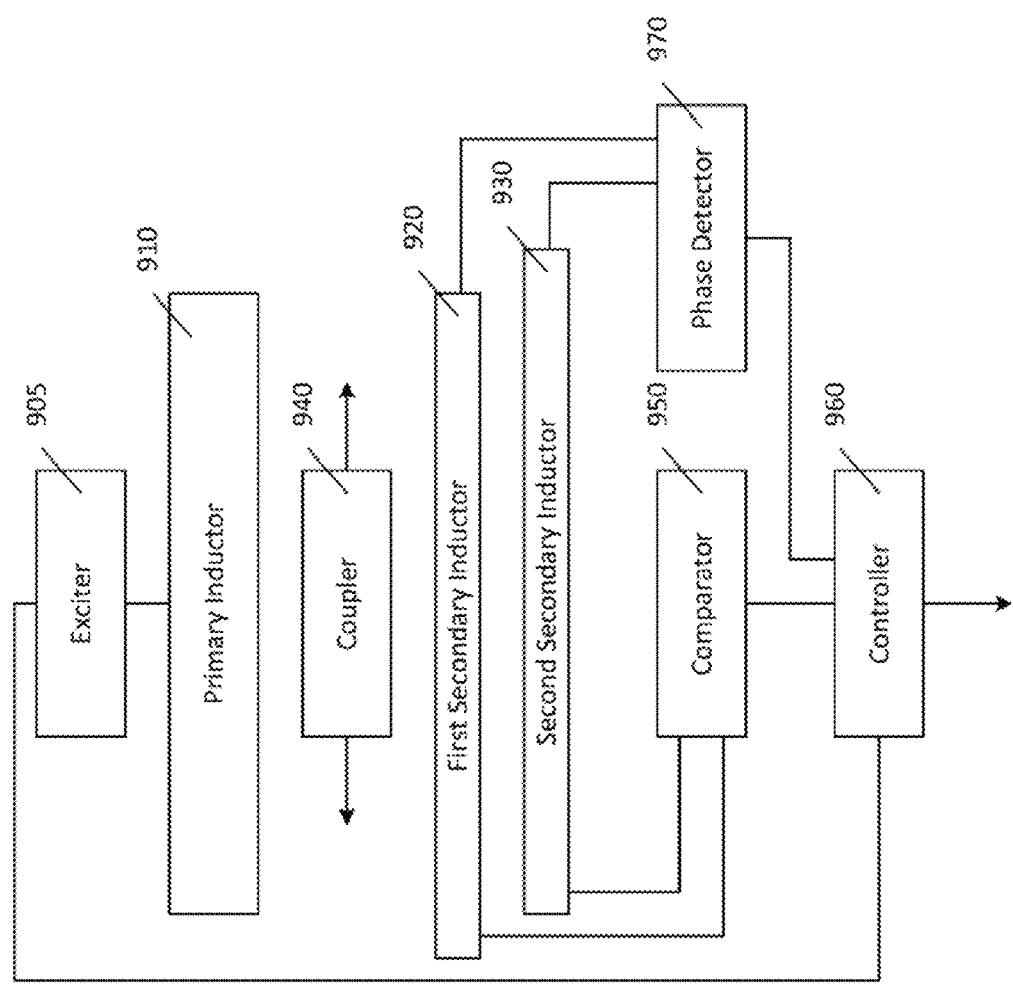
FIG. 9 illustrates an apparatus, according to certain embodiments of the present invention.

FIG. 9 illustrates an apparatus according to certain embodiments of the present invention. As shown in FIG. 9, an apparatus can include a primary inductor 910, a first secondary inductor 920 that is field-coupled to the primary inductor 910 and a second secondary inductor 930 that is field-coupled to the primary inductor 910.

The first secondary inductor 920 and the second secondary inductor 930 can be configured as coordinated inductors to detect motion of a coupler 940. The coupler 940 can be configured to field-couple the primary inductor 910 with the first secondary inductor 920 and the second secondary inductor 930.

By coordinated inductors, it should be understood that these inductors may be configured to cooperate to provide motion and/or position of the coupler 940. Thus, the inductors can be arranged as illustrated, for example, in FIG. 2-5 or 8, or any similar coordinated or cooperative arrangement.

The coordinated inductors can be configured to provide a reference signal and a measurement signal. The reference signal can be configured to have a constant amplitude across a range of motion of the coupler 940. Absolutely precise constancy may not be required. For example, the amplitude can be approximately constant, such as having less variation than the minimum amount of variation measurable by the apparatus. Alternatively, the amplitude may be variable, but greater than a predetermined threshold. Additionally, the amplitude of the reference signal may vary in keeping with variances in the excitation signal from an exciter 905 or due to noise in the environment of the apparatus.

The reference signal can, for example, be configured to be a maximum signal. The measurement signal can be configured to vary linearly with respect to motion of the coupler 940. Alternatively, the measurement signal may be configured to have a non-linear variation with respect to motion of the coupler 940.

The apparatus can also include a comparator 950 configured to compare a first signal from the first secondary inductor 920 and a second signal from the second secondary inductor 930. The comparator 950 can, more particularly, be configured to determine which secondary inductor signal represents the reference signal and which secondary inductor signal represents the measurement signal. This information can be provided explicitly or implicitly to a controller 960. The controller 960 can be a microprocessor or it can be a circuit arrangement, such as a portion of the circuits shown in FIG. 7 including multiplexers and the like.

The controller 960 can be configured to measure a value of the amplitude of the measurement signal and to feed back information regarding the reference signal to the exciter 905.

In certain embodiments of the present invention, the first secondary inductor 920 and the second secondary inductor 930 can be divided into segments with the range of motion of the coupler 940. The range of motion can include a plurality of segments. The number of segments can depend on, among other things, the number of inductors being used.

The apparatus can also include a phase detector 970 configured to identify a current segment out of the plurality of segments, where the current segment corresponds to a position of the coupler 940. This can be done by detecting a phase change of one or both of the signals output from the first secondary inductor 920 and second secondary inductor 930. The phase detector 970 may not need to know which of the two signals is the reference signal and which is the measurement signal. The phase detector 970 is shown separate from the controller 960, but could be incorporated within the controller 960. The phase detector 970 can supply information regarding the detected segment to the controller 960. The controller 960 can output information regarding the position and/or movement of the coupler 940.

The first secondary inductor 920 and the second secondary inductor 930 can be manufactured in various ways, such as by being printed on a circuit board. Other manufacturing techniques are also permitted. The coordinated inductors can be configured to alternate between providing the reference signal and providing the measurement signal. In other words, the coordinated inductors can, in effect, take turns at providing the measurement signal or the reference signal.

The inductor layouts above have been illustrated assuming an essentially linear motion of a coupler. If a coupler is arranged to deflect across a range of angles, for example, or to rotate about an axis in another example, it may be possible to re-arrange the inductors to similarly produce a reference signal and a measurement signal, by appropriately shaping the inductors in accordance with the expected movement path of the coupler. Thus, certain embodiments of the present invention may be independent of the geometric shape and/or mechanical motion of the sensor.

Figure 10:
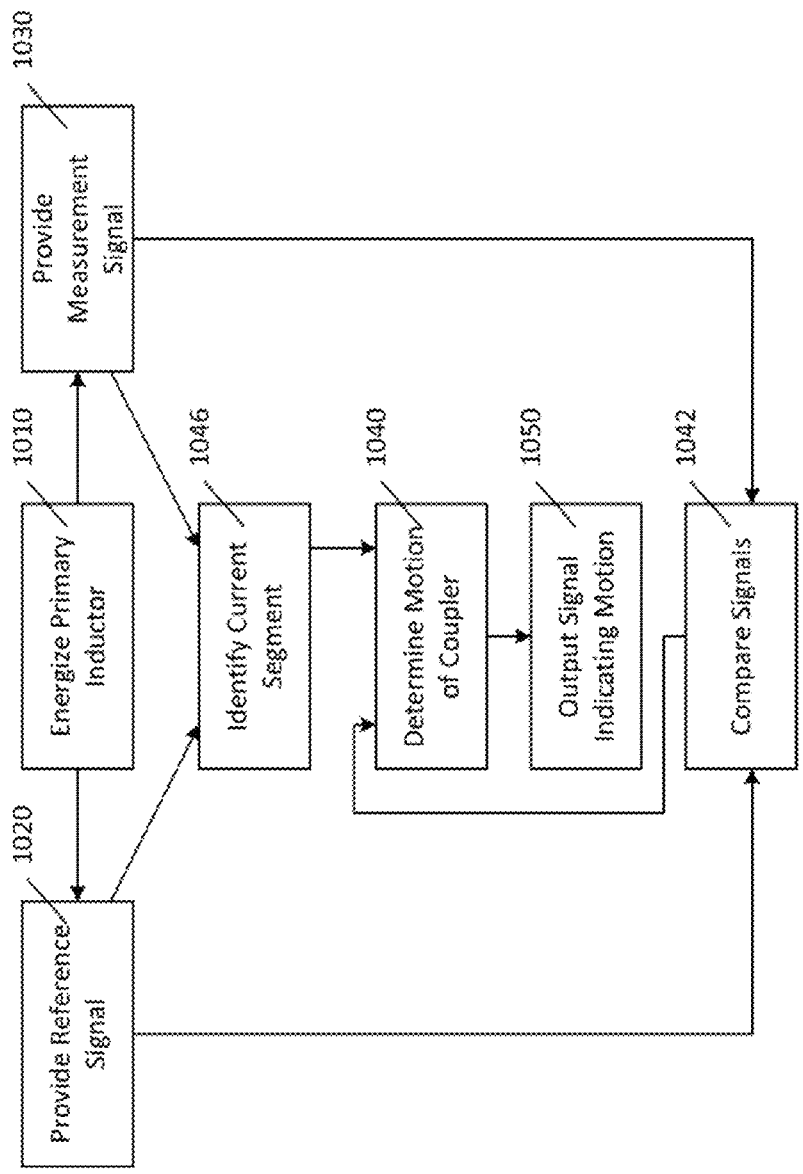
FIG. 10 illustrates a method, according to certain embodiments of the present invention.

FIG. 10 illustrates a method according to certain embodiments of the present invention. As shown in FIG. 10, a method can include, at 1010, energizing a primary inductor. This can be done using an exciter. The method can also include, at 1020, providing a reference signal from at least one of a plurality of secondary inductors. The plurality of secondary inductors can be field coupled to the primary inductor. A pair of secondary inductors from the plurality of secondary inductors can be configured as coordinated inductors. The method can further include, at 1030, providing a measurement signal from at least one other one of the plurality of secondary inductors. The measurement signal can be configured to reflect motion of a coupler. The reference signal can be configured to have a constant amplitude across a range of motion of the coupler. The method can further include, at 1040, determining motion of the coupler based on a variation of the measurement signal. The method can further include, at 1050, outputting an indication of the determined motion.

As noted above, the reference signal can be provided as a maximum signal. Similarly, the measurement signal can be provided varying linearly with respect to motion of the coupler or the measurement signal can be provided varying non-linearly with respect to motion of the coupler.

The method can further include, at 1042, comparing, with a comparator, a first signal from the first secondary inductor and a second signal from the second secondary inductor. The method can further include, at 1050, outputting, from the comparator, a signal indicative of which secondary inductor signal represents the reference signal and which secondary inductor signal represents the measurement signal.

As noted above, the first secondary inductor and the second secondary inductor can be divided into segments with the respect to the range of motion. The range of motion can include a plurality of segments, such as four segments. The method can further include, at 1046, identifying, with a phase detector, a current segment corresponding to a position of the coupler out of the plurality of segments.

Figure 11:
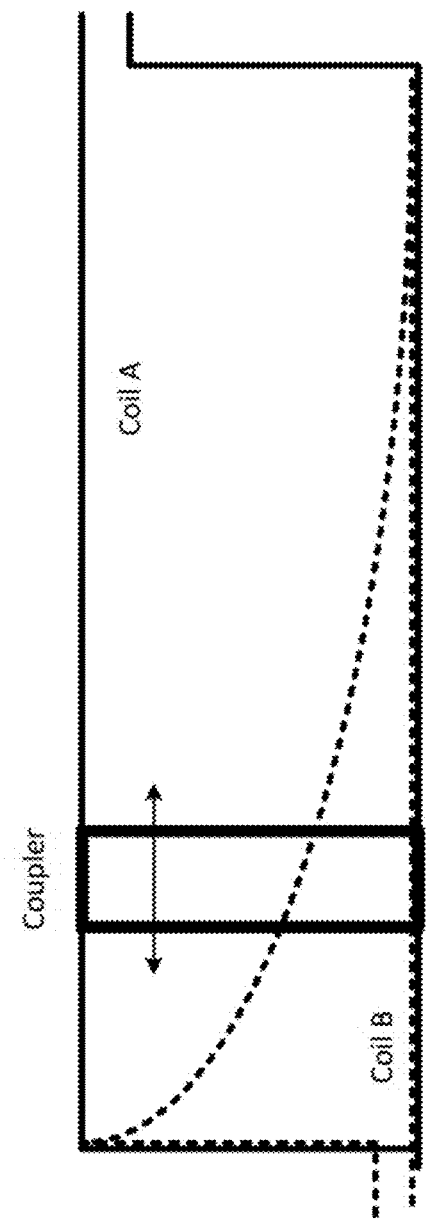
FIG. 11 illustrates an inductive coil configuration, according to certain embodiments of the present invention.

FIG. 11 illustrates an inductive coil configuration, according to certain embodiments of the present invention. In FIG. 2, Coil A has a fixed area over the range of motion of the coupler and Coil B has an area that is less than 50% of Coil A, with the area arranged to change non-linearly over the range of motion of the coupler. Thus, as the coupler moves horizontally across the two coils, the signal from Coil A can remain at an unchanging value while the signal from Coil B can increase as the coupler moves to the left and decrease as the coupler moves to the right. Because the change in Coil B area varies non-linearly, the output signal from Coil B can be non-linear. Only one non-linear shape is shown, but other non-linear shapes are also permitted.

FIG. 12 illustrates a fixed coupled area with varying inductor position, according to certain embodiments of the present invention. As shown in FIG. 12, Coil A can form a periodic shape, such as a saw wave shape. By contrast, Coil B can have a wedge shape similar to that shown in FIG. 2. The period of Coil A's repeating shape can be z units. In such a case, if a coupler is z units wide, then the coupled area will remain fixed as the coupler continuously moves from the position shown as Coupler A to Coupler B or to Coupler C. Although the shape of the coupled area may change, the area itself can remain constant due to the periodic nature of the shape of Coil A. Meanwhile, the coupled area of Coil B can be decreasing from Coupler A to Coupler B or to Coupler C, because there is no similar periodicity in the shape of Coil B. Precisely, in this example in the case of each of Coupler A, Coupler B, or Coupler C, the coupled area is A, where $A=z(v+0.5w)$, referring the dimensions shown in FIG. 12.

FIGS. 13A and 13B illustrate an effect on output current due to position reversal of front side and back side parts of a coil. As shown in FIG. 13A, a coil can be arranged in a figure-eight shape, with a back side part of the coil on one side of a PCB and a front side part of the coil on the other side of a PCB. A transition from back to front can occur at the left side of the coil. A magnetic field coupled to the coil by a coupler can extend in a direction out of the page. Consequently, a counter-clockwise current can be induced in the coupled portion of the loop. This current in the coupled section of the loop can drive a current in the other loop section, in a clockwise direction due to the path of coil traces. Thus, the current flow can be out of the back side part of the coil.

As shown in FIG. 13B, if the same coil is coupled on the right section, the induced current may again be counter-clockwise and may drive a clockwise current in the other loop section. In this case, however, the current flow can be out the front side part of the coil, due to the different geometry of the two parts of the coil. Thus, the same magnetic field can induce opposite output currents depending on the geometry of the secondary coil and the position of the coupler. In the case of a sinusoidal excitation current, the output current of one of FIG. 13A and FIG. 13B can be in phase with the excitation current, and the other output current can be 90 degrees out of phase from the excitation current.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. An apparatus, comprising:
   a primary inductor;
   a first secondary inductor that is field-coupled to the primary inductor; and
   a second secondary inductor that is field-coupled to the primary inductor;
   wherein the first secondary inductor and the second secondary inductor are configured as coordinated inductors to detect motion of a coupler;
   wherein the coordinated inductors are configured to provide a reference signal and a measurement signal, wherein the reference signal has a constant amplitude across a range of motion of the coupler;
   wherein the first secondary inductor and the second secondary inductor are divided into segments with the range of motion, wherein the range of motion comprises a plurality of segments; and
   a phase detector configured to identify a current segment out of the plurality of segments, wherein the current segment corresponds to a position of the coupler.

2. The apparatus of claim 1, wherein the reference signal is configured to be a maximum signal.

3. The apparatus of claim 1, wherein the coupler is configured to field-couple the primary inductor with the first secondary inductor and the second secondary inductor.

4. The apparatus of claim 1, wherein the measurement signal varies linearly with respect to motion of the coupler.

5. The apparatus of claim 1, wherein the measurement signal varies non-linearly with respect to motion of the coupler.

6. The apparatus of claim 1, further comprising:
   a comparator configured to compare a first signal from the first secondary inductor and a second signal from the second secondary inductor, wherein the comparator is configured to determine which secondary inductor signal represents the reference signal and which secondary inductor signal represents the measurement signal.

7. The apparatus of claim 1, wherein the first secondary inductor and the second secondary inductor are printed on a circuit board.

8. The apparatus of claim 1, wherein the coordinated inductors are configured to alternate between providing the reference signal and providing the measurement signal.

9. The apparatus of claim 1, wherein the coupler is of a predetermined width, and wherein the one of the first secondary inductor and the second secondary inductor providing the reference signal are arranged with an area that changes along the direction of travel of the coupler in a periodic repeated manner, the period of which is equal to the predetermined width.

10. A method, comprising:
    energizing a primary inductor;
    providing a reference signal from at least one of a plurality of secondary inductors, wherein the plurality of secondary inductors are field coupled to the primary inductor and wherein a pair of secondary inductors from the plurality of secondary inductors is configured as coordinated inductors;

providing a measurement signal from at least one other one of the plurality of secondary inductors, wherein the measurement signal is configured to reflect motion of a coupler and wherein the reference signal has a constant amplitude across a range of motion of the coupler, wherein the first second inductor and the second secondary inductor are divided into segments with the range of motion, wherein the range of motion comprises a plurality of segments;

determining motion of the coupler based on a variation of the measurement signal; and identify, with a phase detector, a current segment out of the plurality of segments, wherein the current segment corresponds to a position of the coupler.

11. The method of claim 10, wherein the reference signal is provided as a maximum signal.

12. The method of claim 10, wherein the measurement signal varies linearly with respect to motion of the coupler.

13. The method of claim 10, wherein the measurement signal varies non-linearly with respect to motion of the coupler.

14. The method of claim 10, further comprising:

comparing, with a comparator, a first signal from the first secondary inductor and a second signal from the second secondary inductor; and outputting, from the comparator, a signal indicative of which secondary inductor signal represents the reference signal and which secondary inductor signal represents the measurement signal.

15. A system, comprising:

a sensor comprising a primary inductor, a first secondary inductor that is field-coupled to the primary inductor, and a second secondary inductor that is field-coupled to the primary inductor, wherein the first secondary inductor and the second secondary inductor are configured as coordinated inductors to detect motion of a coupler, wherein the coordinated inductors are configured to provide a reference signal and a measurement signal, and wherein the reference signal has a constant amplitude across a range of motion of the coupler, wherein the first second inductor and the second secondary inductor are divided into segments with the range of motion, wherein the range of motion comprises a plurality of segments, the sensor further comprising a phase detector configured to identify a current segment out of the plurality of segments, wherein the current segment corresponds to a position of the coupler; and an output configured to provide a representation of the motion detected by the sensor.

16. The system of claim 15, wherein the measurement signal varies linearly with respect to motion of the coupler.

17. The system of claim 15, wherein the measurement signal varies non-linearly with respect to motion of the coupler.

18. The system of claim 15, further comprising:

a comparator configured to compare a first signal from the first secondary inductor and a second signal from the second secondary inductor, wherein the comparator is configured to determine which secondary inductor signal represents the reference signal and which secondary inductor signal represents the measurement signal.

19. The system of claim 15, wherein the coupler is of a predetermined width, and wherein the one of the first secondary inductor and the second secondary inductor providing the reference signal are arranged with an area that changes along the direction of travel of the coupler in a periodic repeated manner, the period of which is equal to the predetermined width.

* * * * *